United States Patent [19]

Fjarlie

[11] 4,193,691
[45] Mar. 18, 1980

[54] SPECTROMETER

[75] Inventor: Earl J. Fjarlie, Kingston, Canada

[73] Assignee: RCA Corporation, New York, N.Y.

[21] Appl. No.: 792,676

[22] Filed: May 2, 1977

[51] Int. Cl.² ............................................. G01J 3/28
[52] U.S. Cl. .................................... 356/330; 350/331
[58] Field of Search ..................... 356/97, 98; 350/331

[56] References Cited
U.S. PATENT DOCUMENTS 3,578,980  5/1971  Decker et al. .................. 356/98 UX
4,050,814  9/1977  McFadden ....................... 350/331 X

*Primary Examiner*—Edward S. Bauer
*Attorney, Agent, or Firm*—Samuel Cohen; William Squire

[57] ABSTRACT

The slit assembly of the present spectrometer comprises a liquid crystal cell. The electrodes of the cell are selectively actuated for producing a pattern of slits appropriate to the spectral lines of interest in the spectrum derived from the substance under analysis.

14 Claims, 4 Drawing Figures

SPECTROMETER

The present invention relates to optical spectrometers and in particular to correlation spectrometers.

In prior art spectrometers, the slit assembly is made uniquely to detect a given spectrum of radiation or to provide a desired resolution. Factors considered in forming prior art slit assemblies are dispersion characteristics of the instrument including the prism or grating parameters and the characteristics of the optical elements including the lenses and other components. In single slit instruments, the slit is adjusted mechanically to change the resolution. One particular technique in correlation spectrometry utilizes Benedictine slits which select lines from a given emission or absorption band combining the techniques of the spectrograph and the monochromator. The slits are spaced in a predetermined array so that particular spectral lines passed by the slits produce a signal representing the character of the emission or absorption band of interest (such as concentration or strength). If during the measurement the line features of the given emission or absorption band are narrower or broader than originally expected, a new slit assembly is manually inserted into the spectrometer. If a different molecular or spectral feature is under investigation, a completely different set of Benedictine slits must be inserted in the apparatus. That is slow, costly and cumbersome to implement, requiring a large number of different slit assemblies.

An apparatus constructed and operated in accordance with the present invention overcomes the above-noted problems by employing for the slit assembly a liquid crystal cell. The electrodes of the cell are electronically driven to provide optical windows in positions and of shapes appropriate to the spectral lines of interest in the spectrum obtained from the sample under analysis.

In the drawing

Figure 1:
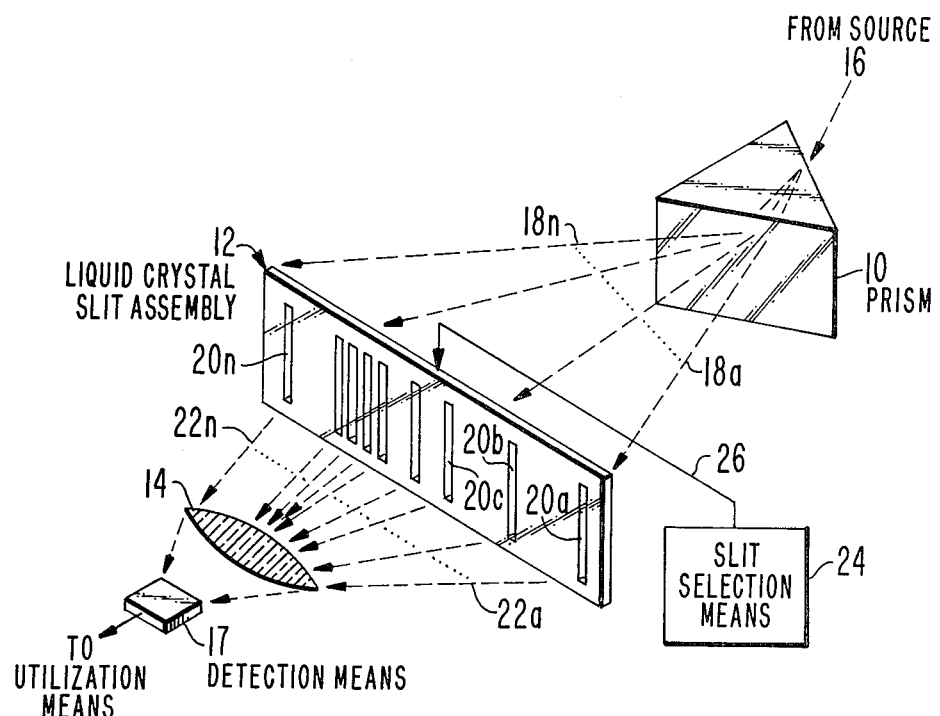
FIG. 1 is an exploded view of certain of the elements in an optical spectrometer including a liquid crystal slit assembly constructed and operated in accordance with an embodiment of the present invention.

A spectrometer embodying the present invention includes a prism 10, a slit assembly 12, a condensing lens 14 and detection means 16 (FIG. 1). The complete spectrometer includes further elements (not shown, but well known in the art) such as an entrance aperture or slit of a shape, appropriate for the light dispersion incident upon the entrance aperture. In addition, a collimating element (not shown) such as a lens or mirror is employed for making parallel the rays which pass through the entrance slit. The collimating element may be a lens or a mirror, as occurs in a grating spectrometer. The dispersing element, prism 10, separates beam 16 into rays 18a-18b of different wavelengths. An adjustable exit aperture formed by assembly 12 is positioned at the focal plane of prism 10. While the exit aperture is shown as a plurality of slits in the present embodiment, it is not intended to be so limited.

In operation, a source of light (not shown) having a certain spectral bandwidth and a given intensity, is passed through a gas sample, e.g., polluted atmospheric air, which alters the intensity of the light in the various wavelengths in a well known manner. The gas is not necessarily physically sampled; the sample may be defined by the solid angle between the source and the slit at the entrance to the instrument. The resulting altered beam of light 16 is then dispersed by prism 10 to separate the spectral regions into spaced rays 18a-18b in accordance with their wavelengths. The wavelengths of some of these rays represent particular substances and their intensities are a measure of the concentration of these substances in the sample through which beam 16 has passed. These certain rays have a given spaced relationship exhibited by the slits 20a, b, c, ... n, illustrated in the slit assembly 12, FIG. 1. The slits 20a, b, c, ... n of assembly 12 form programmable Benedictine slits which define a particular radiation spectrum.

Condensing lens 14 which represents either a single lens or a plurality of lenses, focuses the rays 22a-22n transmitted by slits 20a, b, c, ... n on detection means 16. Detection means 16 includes a photocell or photodiode for converting the incident light from lens 14 into an electrical signal whose amplitude represents the spectrum passed by slits 20a, b, c, ... n. The analysis performed by the combination of prism 10, slits 20a, b, c, ... n, lens 14 and detection means 16 is conventional.

As provided in accordance with the present invention, however, slit assembly 12 comprises a liquid crystal cell. The liquid crystal is of the type which is opaque in its unenergized state and which turns clear in response to an applied electric field. The liquid crystal is located between two glass plates 28, 29 and there are slit shaped transparent electrodes on the inner surfaces of these plates positioned opposite one another. Alternatively, there may be an electrode (sometimes termed a "blackplate electrode") which covers one entire surface and the other surface may have the slit shaped electrodes. When an energizing voltage is applied between a pair of electrodes (or between one electrode and the blackplate electrode) the liquid crystal between this pair of electrodes (or under this one electrode) turns clear and appears as a clear slit in an opaque surround. More details of the cell are given later.

In the present system, means 24 (FIG. 1) are provided for selectively actuating the electrodes via multiconductor cable 26 to provide a desired pattern of parallel slits selected from among the slits 20a ... 20n. One such pattern given by way of example, is shown in FIG. 1. The particular pattern selected will, of course, depend upon the spectrum of interest, that is, the particular spectral lines which are characteristic of the substance (or substances) under test.

As may be implied from the discussion above, selecting means 24 includes a power supply and switch means. Suitable manual switches such as rotary or pushbutton switches may be employed, for selecting the electrodes which are to receive drive voltages. Alternatively, electronic switching arrangements or programming may be employed to provide pre-programmed switching action. If desired, means may be included for electronically scanning different spectra in a sequence in accordance with a given pre-selected program. A system employing such means is described later.

Figure 2A:
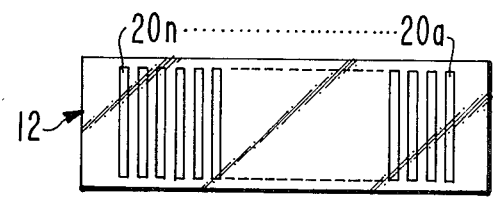
FIGS. 2a and 2b are elevation and plan views, respectively, of the liquid crystal assembly of FIG. 1.
Figure 2B:
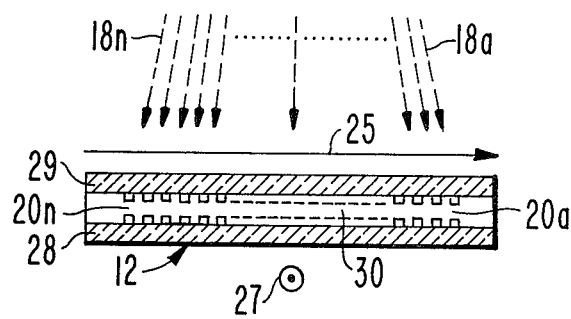

The cell described in brief above, is shown in FIGS. 2a and 2b. The one illustrated employs a field effect liquid crystal and the cell therefore includes polarizer 25 and an analyzer 27. The front and back plates are hermetically sealed at the edges. The exciting voltage may be a low frequency alternating voltage, for example.

The mechanism by which light either passes or is blocked by the liquid crystal cell is well understood. In brief, the polarizer 25 horizontally polarized the light entering the cell. In the case in which the liquid crystal is in the unenergized state, the radiation follows the optical axis of the molecules of material 30 and experiences a 90° rotation of its plane of polarization in passing through the liquid crystal layer. The second polarizer (analyzer 27) blocks the radiation and the display appears uniformly dark. When a voltage is applied across the slit electrodes, the molecules of material 30 abandon their alignment surfaces and align themselves with the electric field. The 90° twist is no longer applied and the slits become transparent in the desired region. This radiant energy gating action of the slits provides high contrast ratios with a simple optical arrangement.

To provide a universal slit assembly, the slit electrodes are etched in relatively narrow bands; for example, 0.015 inches wide with spacing between the electrodes of about 0.005 inches. These dimensions are exemplary as the actual sizes may vary from spectrometer to spectrometer in accordance with a given implementation. The spectrometer resolution, as determined by the slit width and slit spacing, is chosen to match the desired capability of the instrument. The resolution may be altered by selecting a combination of adjacent slits which determines the effective width of that slit. That is, for example, by energizing three next adjacent electrodes the three slits so formed effectively form a single slit having a slit width of three electrodes plus electrode spacing. The narrow connecting opaque portions between slits are constructed to have negligible effect on the transmission characteristics of the slit formed by the three adjacent slits. The selection means 24 may be pre-programmed to provide both resolution and combinations of slits to give a slit spacing selection in accordance with a given desired spectrum analysis to be performed.

In an alternative form of construction, the liquid crystal may be of the dynamic scattering rather than of the field effect type. In this event, the analyzer and polarizer are omitted. Also, the lens 14 and detections means 16 of FIG. 1 are disposed in such a way as to minimize the detection of unwanted side scattering radiation. Also, the electrode structure will be such as to maintain those regions of the liquid crystal which it is desired to opaque in an energized state and those regions which are to operate as slits in the unenergized state.

A sensor (not shown) may be disposed to collect light from the slit assembly 12 for independently monitoring the brightness of transmittance of the individual slits $20_a$–$20_n$. A feedback loop (not shown) adjusts the spectral slit width accordingly to maintain a desired brightness level. The penalty for this is a varying resolution, however.

While a Benedictine slit configuration is illustrated in FIG. 1, it is apparent that the present invention is not limited to such an arrangement. For example, a single slit may be provided whose effective slit width is adjusted by the slit selection means as described above. Another arrangement may include electronic slits of the type utilized in Hadamard spectroscopy where the coding can be adjusted electronically in zones where the zone widths or heights could be adjusted by choosing certain combinations of electrodes.

Figure 3:
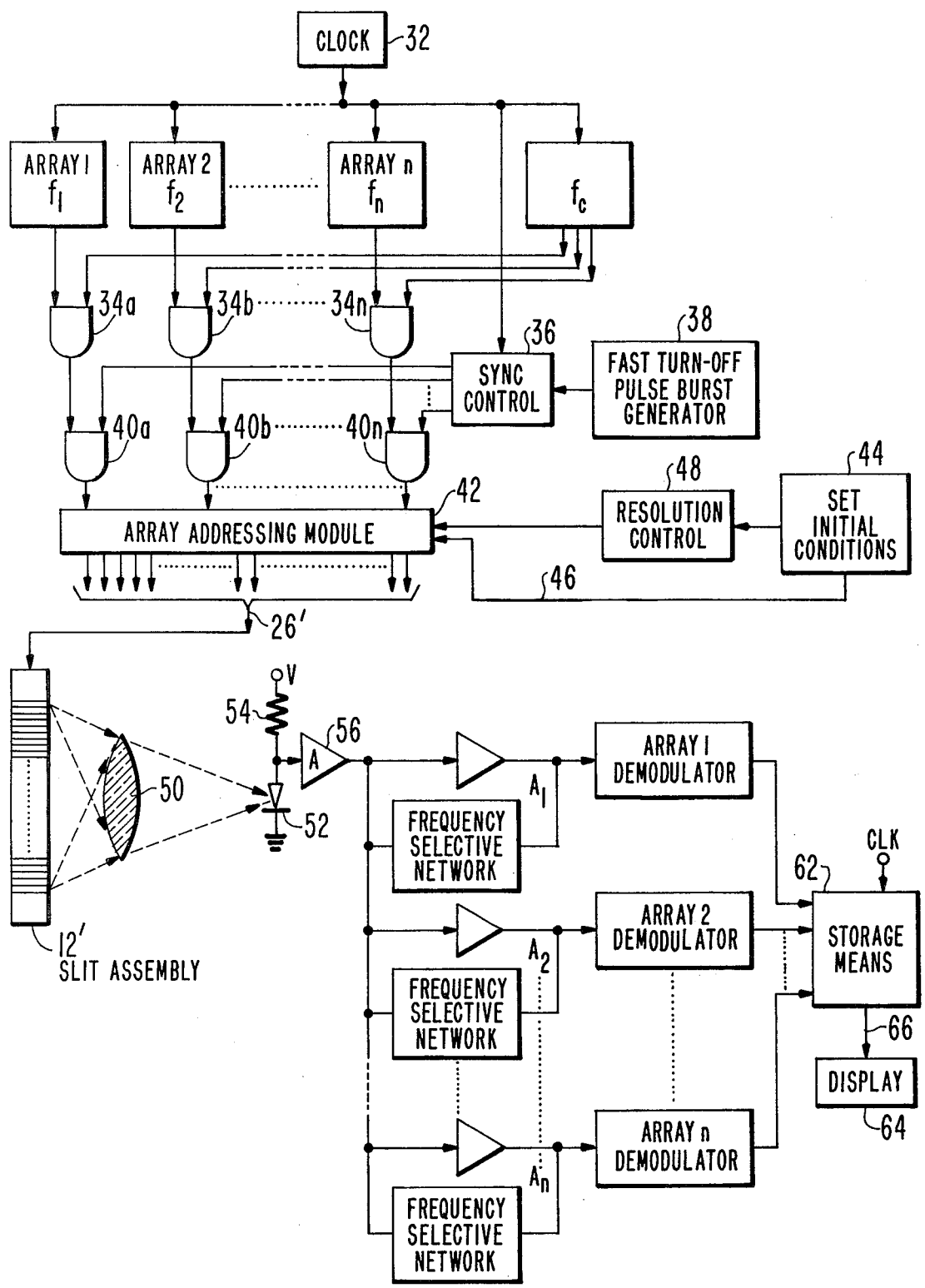
FIG. 3 is a block diagram of a multiplex arrangement utilizing a liquid crystal slit assembly in a spectrometer.

In FIG. 3, a multiplex modulation system is shown for modulating the slits in assembly 12 to provide Benedictine slits. This permits electronic investigation of a plurality of molecules simultaneously. Note that ac fields are required for driving the liquid crystals. A suitable clock signal from clock 32 is divided into modulating frequencies $f_1$–$f_n$ by frequency dividing arrays, array 1–array n. Field signal $f_c$ is also derived from clock 32. Signal $f_c$ is the switching field whereas $f_1$–$f_n$ are the identifying fields. The individual slits are switched on by by the presence or absence of $f_c$. The selected groupd of slits are identified by the addition of $f_1, f_2, \ldots, f_n$. The detector 52 sees a total radiation intensity which is the combined radiation from all of the slits at $f_1, f_2, \ldots, f_n$. The incoming radiation $18a \ldots 18n$ (FIG. 1) is not modulated by signal $f_c$, that frequency supplies the E-field to change the orientation of the liquid crystal, but the slit opens and closes according to frequency $f_1, f_2, \ldots, f_n$ and this is the modulation of the incoming light. The array 1–array n outputs are each applied as a separate, different first input into each of a like plurality of corresponding AND gates $34_a$–$34_n$. Array 1 applies an input to gate $34_a$, array 2 to gate $34_b$, and so on. Signal $f_c$ is applied as a second enabling input to each of AND gates $34_a$–$34_n$. The clock 32 output is applied to sync control 36.

A second input to sync control is the output of fast turn-off pulse burst generator 38. The outputs of sync control 36 are applied as separate, different corresponding inputs to each of respective AND gates $40_a$–$40_n$. A second input applied to AND gates $40_a$–$40_n$ is the outputs of gates $34_a$–$34_n$. The output of $34a$ is applied to gate $40_a$, $34_b$ to $40_b$, and so on. Each gate $40_a$–$40_n$ output is selectively applied as an input to array addressing module 42. The selection of gates $40_a$–$40_n$ is made by sync control 36. Sync control 36 includes logic circuitry pre-programmed to selectively enable certain ones of gates $40_a$–$40_n$ in accordance with a given program.

Each gate $40_a$–$40_n$ may represent a different combination of Benedictine slits or resolutions or any combination thereof. Array addressing module 42 is a logic network which is responsive to selected input signals from gates $40_a$–$40_n$ to provide a respective slit assembly $12'$ electrode energizing signal on cable $26'$. The slit electrodes of assembly $12'$ are each connected to a separate output of array addressing module 42 for selective energization as determined by the corresponding gate $40_a$–$40_n$. Certain of the inputs of module 42 are pre-programmed to be energized upon receipt of a signal from gate $40_a$. A second predetermined array of outputs of module 42 are energized upon receipt of a signal from gate $40_b$ and so on through gate $40_n$. Whenever a signal appears on each of the selected gates $40_a$–$40_n$ outputs a corresponding selected combination of slits $20_a$–$20_n$ are energized.

Timing of sync control 36 is provided by clock 32, which sequentially energizes in a given order gates $40_a$–$40_n$. Control 36 may include a suitable logic network which provides pre-programmed energizing signal to each of the inputs of gates $40_a$–$40_n$ in a selected sequence. Not all outputs of module 42 need be energized in a given program. Only those outputs are energized corresponding to the particular combination of the slit array then being energized. Additionally, control 36 gates the high energy pulse signal produced by generator 38 to each of the selected gates $40_a$–$40_n$. The high energy turn-off pulses accelerate the turn-off time of the energized electrodes. The high energy pulse produced by generator 38 is timed to coincide at the turn-off time of the energizing signal applied to the slit assembly 30 electrode. Such high voltage pulse turn-off signals are described in an article entitled "Liquid Crystal Matrix Displays" by Bernard J. Lechner, Frank J. Marlowe, Edward O. Nester and Juri Tults in the Proceedings of the IEEE, Vol. 59, No. 11, 1971, at page 1569.

By way of example, frequency $f_1$ may be 20 hertz, $f_2$, 30 hertz, $f_n$, 50 hertz and $f_c$, 350 hertz. Each of the signals $f_1$–$f_n$ modulates the signal frequency $f_c$. The set initial conditions control 44 manually programs module 42 to address particular ones of the module 42 outputs. Thus, the set intitial conditions control 44 pre-programs module 42 via cable 46 so that any selected ones of the electrodes of slit assembly 12' are energized by selected ones of the signals passed by gates $40_a$–$40_n$. Control 44 may include a set of switches manually operated or semiconductor elements having programmable memory function. In the case where control 44 includes programmable semiconductor memory elements cable 46 applies a plurality of signals pre-addressed by control 44 to the module 42. This action selectively closes paths between each of the gates $40_a$–$40_n$ and the selected outputs of module 42. Where the control 44 is a manual set of switches, the switches close the selected paths between the gates $40_a$–$40_n$ and module 42 outputs.

Resolution control 48 is set by control 44 to program module 42 to address one or more next adjacent ones of the electrodes on slit assembly 30 in accordance with the desired resolution. Control 48 may be a set of manual or electronic switches including programmable memory functions. Control 48 may program the output addresses of module 42 independently of the set initial conditions control 44. In the alternative, resolution control 48 may include electronic means responsive to an output signal from control 44 for automatically setting the resolution of assembly 12'.

Sync control 36 is preprogrammed such that the fast turn-off pulse is applied to the proper array gate $40_a$–$40_n$ in a given instance. Each of the gates is operated with only one frequency out of $f_1$–$f_n$ at a given instance. It is possible to switch gates and slits interleaved in time, but this is a refinement not basic to the main idea and is likely to be difficult at these frequencies. To preclude unwanted turn-on of electrodes next adjacent to the electrodes being turned on, the multiplexed next adjacent in time slits are selected to be sufficiently physically spaced apart so as to be electrically isolated from those electrodes previously activated. It is expected in practice that the demand for given measurements will naturally form the spacing.

A condensing lens 50 similar to lens 14 in FIG. 1, is positioned to concentrate the spectrum transmitted by the slit assembly 12' to detector 52. In the alternative, a number of lenses may be disposed in an array where each lens is responsive with baffling to a separate, different group of slits. Also, a plurality of detectors may be disposed adjacent to each of such lenses. In a further alternative, a separate detector 52 may be provided each slit without a condensing lens 50 wherein the outputs of each of such detectors are electrically summed.

Detector 52 is operated by a voltage V applied across resistance 54, detector 52 and ground. The detecting signal is applied to preamplifier stage 56 to a series of parallel tuned amplifier stages $A_1$–$A_n$. Amplifier stages $A_1$–$A_n$ include amplifiers and notch filters in feedback paths and have a frequency response selected to be responsive to a separate, different one of the chopping frequencies $f_1$–$f_n$. The notch filters could be of the type described in Electronic Engineering Times, Feb. 7, 1977, p. 45. The signals at the respective frequencies are applied from the tuned stages $A_1$–$A_n$ to the corresponding array 1–array n demodulator stages. The demodulator stages recover the signal level for each selected slit array corresponding to the preprogrammed spectrums under analysis. The outputs of each of the demodulator stages array 1–array n are signals manifesting the spectrum under investigation selected by the array addressing module 42. The demodulated signals are applied as inputs to storage means 62 which includes semiconductor memory elements and shift registers arranged to be clocked by the clock signal produced by clock 32 so as to selectively store each of the signals produced by the demodulator stages array 1–array n. Storage means 62, for example, may be a multi-channel analyzer which sequentially stores each of the inputs from the demodulator stages in a separate different channel and applies the stored information to a suitable display 64 via output 66.

When the slit assembly 12' acts as a signal slit having differing resolutions, one demodulator stage is utilized. The control 44 at that time may activate storage means 62 so that only one memory stage is responsive to the corresponding demodulator stage.

By driving one set of slits at one frequency and a second set of slits at another frequency, which is electronically separated by the frequency selective network from the first frequency, it is possible to investigate two or more molecules in a material under investigation at the same time under the same experimental conditions. The different frequencies representing the different molecular spectra are separated by the appropriate electronic filtering provided by the tuned amplifier stages $A_1$–$A_n$.

It is expected that there will be some loss due to the liquid crystal slits but no absorption, provided the spectral bandpass of the host liquid is not exceeded. The substrate material has four surfaces which require anti-reflection coatings.

When the liquid crystal material is used in the reflecting scattering configuration, positioning of the detectors would be more complex to distinguish between the reflected as compared to the scattered radiation from the slit assembly. However, the basic adjustment means for selecting the slits from the slit assembly would be similar to that described above.

In operation the apparatus of FIG. 3 is disposed to analyse the material, e.g., a gas, under investigation in the usual manner as for conventional spectrometers. Depending on the type of constituents in the gas being analyzed, the set initial conditions control 44 is programmed to set the array addressing module 42 to energize selected ones of the slits of slit assembly 12' so that the expected spectrum from each of the molecules under analysis is programmed into the system. The modulated frequencies $f_1$–$f_n$ are selectively addressed by module 42 to the corresponding selected electrodes of assembly 12'. Detector 52 then detects the difference signals transmitted by assembly 12' which are separated by the corresponding frequency selective stages $A_1$–$A_n$ and demodulated by arrays 1–array n. The demodulated information is then stored by storage means 52 for later display or for simultaneous display via display 64.

FIG. 3 shows one possibility for a controller; the basic idea is contained in the slit assembly 12' and the ease of changing the slits which pass light.

In the simplest case each of the demodulator outputs could drive a pen recorder since the signal would be dc and is proportioned to the intensity of that emitter or absorber. It would be possible to drive a digital display which has been calibrated to yield concentrations directly. Hence display 1 would be for array 1, display 2 for array 2 and so forth. When the operator selects the array or when the preprogrammed controller selects the array for a given measurement, it would also choose multiplying factors for the display and the results would be given automatically as the controller cycled through a program of measurements.

What is claimed is:

1. In a spectrographic analysis system in which a spectrum derived from a sample under test in projected onto a slit assembly, the assembly including slits positioned to pass only those spectral lines of interest in the measurement of the concentration of one of a number of different substances which may be present in the sample, the improvement comprising:

said slit assembly comprising a liquid crystal cell with electrodes at opposite surfaces of the cell for defining the slits in response to voltages applied thereto; and control means connected to said slit assembly for applying voltages to said electrodes for producing a selected one of a plurality of possible slit patterns, that one pattern being appropriate to the analysis of the particular substance of interest in the sample, said control means including modulating means for generating a slit modulating signal and for applying said slit modulation signal to a selected group of said slits to generate a modulated selected spectrum for opening the slits at the modulation frequency, and output means including detecting means for detecting said modulated spectrum, and means responsive to said detected modulated spectrum applied as an input thereto for generating said spectrum signal as an output thereof.

2. In the system of claim 1 wherein said control means includes preprogram means connected to said slit assembly for successively selectively applying said voltages to said electrodes in accordance with a given program to successively produce said plurality of slit patterns.

3. In the system of claim 2 further including means for detecting the energy transmitted by said plurality of patterns and for producing an output signal representing the spectra of each said transmitted energy.

4. In the system of claim 1 wherein said slit assembly includes means for orienting said slits parallel and coplanar.

5. In the system of claim 1 wherein said control means includes means for controlling the effective slit width of each slit in said slit patterns.

6. In a spectrographic analysis system for indicating the presence and concentration in a sample under test of any one of a number of different substances, and which includes means for translating radiation which has passed through the sample into a spectrum and means for directing that spectrum onto a slit assembly, an improved such assembly comprising:

a liquid crystal cell comprising a liquid crystal and electrodes at opposite surfaces of said liquid crystal responsive to applied voltages for switching the liquid crystal between clear and opaque optical states, said electrodes defining a pattern of slits; and means for selectively applying voltages to said electrodes for producing a desired pattern of slits in positions corresponding to the spectral lines of interest in the spectrum being produced by the substance under analysis, said means for selectively applying including modulating means for generating a slit modulating signal and for applying said slit modulation signal to a selected group of said slits to generate a modulated selected spectrum for opening the slits at the modulation frequency, and output means including detecting means for detecting said modulated spectrum, and means responsive to said detected modulated spectrum applied as an input thereto for generating said spectrum signal as an output thereof.

7. The system of claim 6 wherein said means for selectively applying voltages includes means for controlling the effective slit width of said pattern of slits.

8. A spectrometer comprising:

means for producing a spectrum of light, detector means for producing an output signal in response to said light spectrum incident thereon, an array of slits disposed between said detector means and said means for producing a spectrum of light, said array of slits being formed of liquid crystal material having first and second light transmission states, said slits transmitting the light incident thereon only when in one of said states, said liquid crystal material being selectively placed in said states in accordance with a plurality of slit control voltages applied thereto, electronic means connected to said liquid crystal material for generating said control voltages, said control voltates selectively placing a group of said slits in said one state, said electronic means including modulating means for generating a slit modulating signal and for applying said slit modulation signal to a selected group of said slits to generate a modulated selected spectrum for opening the slits at the modulation frequency, and output means including detecting means for detecting said modulated spectrum, and means responsive to said detected modulated spectrum applied as an input thereto for generating said spectrum signal as an output thereof, and output means responsive to said output signal applied as an input thereto for producing a spectrum signal representing the spectra transmitted by said selected group of slits.

9. The spectrometer of claim 8 wherein said electronic means for generating said slit control voltages including means for successively selectively placing a plurality of separate, different groups of said slits in said one state, and said output means includes means for producing a signal representing the spectra transmitted by each of said plurality of groups of slits.

10. The spectrometer of claim 8 wherein said electronic means including addressing means for selectively energizing said liquid crystal material corresponding to said group of slits in response to an address input signal and means for applying said address input signal to said array addressing means.

11. The spectrometer of claim 10 wherein said array addressing means includes means responsive to a periodic signal having a repetition rate in a given range, said liquid crystal material being responsive to said periodic signal applied thereto for placing said material in said one state, and said means for applying said address input signal to said addressing means includes means for selecting a given repetition rate of said periodic signal and applying said periodic signal recurring at said given repetition rate to said array addressing means.

12. The spectrometer of claim 11 wherein different groups of said slits each correspond to a different predetermined repetition rate of said periodic signal, said means for selecting and applying said periodic signal including means for cyclically selectively applying said periodic signals recurring at said different repetition rates to said array addressing means, said array addressing means including means for applying said periodic signals recurring at said different repetition rates to said liquid crystal material corresponding thereto.

13. The spectrometer of claim 8 wherein said means responsive to said detected modulated spectrum includes signal demodulating means for selectively demodulating said detected signal.

14. The spectrometer of claim 13 wherein said modulating means includes means for generating a plurality of slit modulating signals recurring at different repetition rates, each repetition rate corresponding to a group of slits, said electronic means including preprogrammed means for selectively energizing each group of slits with a corresponding modulating signal of a given repetition rate, said demodulating means including a like plurality of signal demodulators each corresonding to a separate group of slits for producing said spectrum signal representing the spectrum produced by all said groups of slits.

* * * * *